United States Patent
Jorgensen et al.

(10) Patent No.: US 9,221,965 B2
(45) Date of Patent: *Dec. 29, 2015

(54) METHOD FOR MANUFACTURING A MINERAL FIBRE-CONTAINING ELEMENT AND ELEMENT PRODUCED BY THAT METHOD

(75) Inventors: Kristian Skovgaard Jorgensen, Roskilde (DK); Cor Ghijzen, Susteren (NL); Martinus Adriana Baets, Swalmen (NL)

(73) Assignee: Rockwool International A/S, Hedehusene (DK)

( * ) Notice: Subject to any disclaimer, the term of this patent is extended or adjusted under 35 U.S.C. 154(b) by 95 days.

This patent is subject to a terminal disclaimer.

(21) Appl. No.: 13/978,648

(22) PCT Filed: Nov. 9, 2011

(86) PCT No.: PCT/EP2011/069777
§ 371 (c)(1),
(2), (4) Date: Sep. 12, 2013

(87) PCT Pub. No.: WO2012/103966
PCT Pub. Date: Aug. 9, 2012

(65) Prior Publication Data
US 2014/0001676 A1    Jan. 2, 2014

(30) Foreign Application Priority Data

Jan. 31, 2011   (EP) .................................. 11152672

(51) Int. Cl.
*D01G 9/06* (2006.01)
*D01G 23/02* (2006.01)
(Continued)

(52) U.S. Cl.
CPC ................. *C08L 23/06* (2013.01); *B29C 43/00* (2013.01); *B29C 67/248* (2013.01); *B29C 67/249* (2013.01); *C03C 13/06* (2013.01); *C03C 25/24* (2013.01); *C08L 23/12* (2013.01); *C08L 27/18* (2013.01); *C08L 33/08* (2013.01); *C08L 61/06* (2013.01); *C08L 63/00* (2013.01); *C08L 75/02* (2013.01); *C08L 75/04* (2013.01); *C08L 79/04* (2013.01); *D01G 9/06* (2013.01);
(Continued)

(58) Field of Classification Search
CPC ...... B29C 67/248; B29C 67/249; D01G 9/00; D01G 9/06; D01G 9/16; D01G 23/02; D01G 23/08; D04H 1/4209; D04H 1/4218; D04H 1/4226; D04H 1/60; D04H 1/64; D04H 1/732; D04H 1/736; D04H 1/58; D04H 1/587
USPC ......... 156/62.2, 62.4; 264/109, 115, 116, 121
See application file for complete search history.

(56) References Cited

U.S. PATENT DOCUMENTS 2,682,085 A    6/1954  Novotny et al.
3,150,025 A *  9/1964  Slayter et al. ................ 425/82.1
(Continued)

FOREIGN PATENT DOCUMENTS

EP    1300511       4/2003
WO    2009146056    12/2009
(Continued)

*Primary Examiner* — Michael Tolin
(74) *Attorney, Agent, or Firm* — Tarolli, Sundheim, Covell & Tummino LLP

(57) ABSTRACT

The invention relates to a method for manufacturing a mineral fiber-containing composite and the novel mineral fiber-containing element produced by that method.

17 Claims, 2 Drawing Sheets

(51) Int. Cl.
| | | |
|---|---|---|
| *D01G 23/08* | (2006.01) | |
| *D04H 1/4226* | (2012.01) | |
| *D04H 1/736* | (2012.01) | |
| *C08L 23/06* | (2006.01) | |
| *B29C 67/24* | (2006.01) | |
| *D01G 9/16* | (2006.01) | |
| *D04H 1/4209* | (2012.01) | |
| *D04H 1/4218* | (2012.01) | |
| *D04H 1/732* | (2012.01) | |
| *D04H 1/587* | (2012.01) | |
| *C03C 13/06* | (2006.01) | |
| *C03C 25/24* | (2006.01) | |
| *D04H 1/54* | (2012.01) | |
| *D04H 1/60* | (2006.01) | |
| *D04H 1/64* | (2012.01) | |
| *D04H 1/72* | (2012.01) | |
| *B29C 43/00* | (2006.01) | |
| *C08L 23/12* | (2006.01) | |
| *C08L 27/18* | (2006.01) | |
| *C08L 33/08* | (2006.01) | |
| *C08L 61/06* | (2006.01) | |
| *C08L 63/00* | (2006.01) | |
| *C08L 75/02* | (2006.01) | |
| *C08L 75/04* | (2006.01) | |
| *C08L 79/04* | (2006.01) | |

(52) U.S. Cl.
CPC ............... *D01G 9/16* (2013.01); *D01G 23/02* (2013.01); *D01G 23/08* (2013.01); *D04H 1/4209* (2013.01); *D04H 1/4218* (2013.01); *D04H 1/4226* (2013.01); *D04H 1/54* (2013.01); *D04H 1/587* (2013.01); *D04H 1/60* (2013.01); *D04H 1/64* (2013.01); *D04H 1/72* (2013.01); *D04H 1/732* (2013.01); *D04H 1/736* (2013.01)

(56) References Cited

U.S. PATENT DOCUMENTS

| | | | | |
|---|---|---|---|---|
| 3,308,945 | A | * | 3/1967 | Oja .................................. 209/3 |
| 3,422,920 | A | * | 1/1969 | Greason et al. ............... 181/291 |
| 4,072,558 | A | | 2/1978 | Akerson |
| 4,507,197 | A | * | 3/1985 | Koenig et al. .................... 209/2 |
| 5,014,396 | A | * | 5/1991 | Nieminen ...................... 19/205 |
| 5,149,920 | A | * | 9/1992 | Meeker et al. ............... 181/290 |
| 5,458,960 | A | | 10/1995 | Nieminen et al. |
| 6,305,920 | B1 | | 10/2001 | Kean et al. |
| 2007/0060005 | A1 | | 3/2007 | Yang et al. |

FOREIGN PATENT DOCUMENTS

| | | |
|---|---|---|
| WO | WO 2011/012710 A1 * | 2/2011 |
| WO | WO 2011/012712 A1 * | 2/2011 |

* cited by examiner

METHOD FOR MANUFACTURING A MINERAL FIBRE-CONTAINING ELEMENT AND ELEMENT PRODUCED BY THAT METHOD

FIELD OF THE INVENTION

The invention relates to a method for manufacturing a mineral fibre-containing composite and the novel mineral fibre-containing element produced by that method. The invention also relates to apparatus suitable for carrying out the method of the invention.

BACKGROUND OF THE INVENTION

The present invention relates particularly to mineral fibre-containing elements that are produced by pressing and curing a mixture of mineral fibres and binder to produce a pressed board, often having a thickness of from 4 mm to 25 mm. These boards generally have a density of from 120 kg/m$^3$ to 1000 kg/m$^3$, such as 170 kg/m$^3$ to 1000 kg/m$^3$ and can be used as protective cladding on the outside of buildings or as acoustically insulating/absorbing ceiling or wall panels.

Previously, these products have been produced by subjecting a combination of mineral wool and binder to a mixing and forming process and subsequently pressing and curing the formed mixture to the desired density. The binder is generally either added to the mineral wool as dry binder, or uncured mineral wool is used where binder has been included during the fibre-forming and collection process.

Such products are technically and commercially successful, but we find that there is room for improvement. Specifically, we find that one problem with the methods of the prior art is that the mixing and forming processes used have a tendency to produce some compact balls of mineral wool in the mixture, or at least not to open up the compacted mineral wool. Furthermore, the methods used in the prior art do not contain any means for removing compacted mineral wool from the mixture so the uneven distribution is carried into the final product.

Where certain areas of the product have a higher density of mineral fibres, this can result in a higher concentration of binder in that area as well. Having an uneven distribution of mineral wool and binder in the product can be problematic for a number of reasons.

Firstly, there can be regions of the product where the binder is not cured thoroughly. This will decrease the overall strength and rigidity of the panel.

Secondly, where there is an uneven distribution of the components, this is likely to compromise the acoustic properties of an acoustic ceiling or wall panel.

Thirdly, as this type of panel is generally used in applications where the face of the panel is visible, it is important that the panels are aesthetically pleasing. An uneven distribution within the panel can result in undesirable inconsistencies at the surfaces. Where a high level of binder is concentrated in a small area, this can result in a spot on the surface of the product.

In some cases the surface of the panel will be painted and an uneven distribution of components or areas where the binder is not thoroughly cured can result in the paint not being accepted in an even manner across the surface.

Furthermore, in some products, especially those used as cladding for the outside of buildings, it has up to now been necessary to use a relatively high level of binder in order to provide a product of sufficient strength and rigidity. The high level of binder required is in part due to some binder being wasted as it is present in an unnecessarily high concentration in areas of the panel where there was compacted mineral wool in the mixture before pressing. As mentioned above, the full benefit of this binder is not transferred to the product, partly because it tends to be incompletely cured.

Having a high level of binder in the product is expensive and can reduce the fire resistant properties of the product. Therefore, it would be desirable to use less binder to provide a panel having a comparable strength and rigidity.

It is, therefore, an object of the invention to provide a method for forming a mineral fibre-containing element of the type described above having improved strength and rigidity or a reduced level of binder, or both.

A further object of the invention is to provide a method of forming a mineral fibre-containing element of the type described above that is homogeneous, having a more even distribution of components. It is also an object of the invention to provide a method for producing a mineral fibre-containing element having a surface with a more consistent and even appearance.

U.S. Pat. No. 2,682,085 discloses an apparatus for cleaning and opening fragile fibres, such as mineral wool fibres. This rather old prior art (filed 1949) suggests a relatively complex method and apparatus for opening and cleaning fibres to remove particles and dirt therefrom. Fibres are fed into the apparatus as bunches or masses of fibres. After opening and cleaning, fibres are collected in the form of a light, fluffy, low-density felted layer or web.

The aim of U.S. Pat. No. 2,682,085 is to clean and open the fibres for the formation of a light, fluffy, low-density web. The formation of rigid panels is not discussed in this document and no indication is given of the advantages of disentangling fibres and suspending them in an air flow in the context of the strength, rigidity, or any other property of a pressed and cured panel of the type used as cladding for buildings or as ceiling or wall panels.

SUMMARY OF THE INVENTION

According to the invention the objects discussed above are achieved with a method for manufacturing a mineral fibre-containing element, said method comprising the steps of:
providing mineral fibres in an amount of from 70 to less than 90 of the total weight of starting materials in the form of a collected web,
providing a binder in an amount of from greater than 10 up to 30 wt % of the total weight of starting materials,
subjecting the collected web of fibres to a disentanglement process, suspending the fibres in a primary air flow,
mixing the binder with the mineral fibres before, during or after the disentanglement process to form a mixture of mineral fibres and binder, collecting the mixture of mineral fibres and binder and pressing and curing the mixture to provide a consolidated composite with a density of from 120 kg/m$^3$ to 1000 kg/m$^3$, such as 170 kg/m$^3$ to 1000 kg/m$^3$.

This method can be used to produce a novel mineral fibre-containing element.

The percentages mentioned are based on dry weight of starting materials.

With the method according to the invention as defined above a versatile and cost efficient method for manufacturing a mineral fibre-containing composite is achieved. By adjusting the density to which the element is pressed, a variety of different composites can be made that are tailor-made for specific purposes.

Furthermore, it has been found that by subjecting the mineral fibres to a fibre disentanglement process, compacted mineral fibres are opened up and the mineral fibres and binder are more evenly distributed in the element produced. This increased homogeneity in the element results generally in an increased level of mechanical strength relative to the elements of the prior art.

The even distribution of fibres and binder in the element also has a desirable effect on the acoustic insulation properties of the element.

Furthermore, the elements produced by the method of the present invention have advantages in terms of aesthetic appeal and consistency of properties throughout a single element It has also been found that the composites of the present invention as a result of their homogeneity can be machinable in a similar way to wood. By "machinable" it should be understood that the composite can be machined in ordinary wood forming machinery, such as saws and shaping machines, e.g. grooving machines, surface milling cutters etc.

The elements produced by the method of the invention have a variety of uses, predominantly as building elements. In particular, the products can be in the form of panels. In general, the products are used in applications where mechanical stability and an even surface finish as well as insulating properties are important. In some applications, the panels can be used as acoustically absorbing ceiling or wall panels. In other applications, the panels can be used as insulating outer cladding for buildings.

Preferably, the composite is in the form of a panel. Preferably the thickness of the panel is from 4 to 25 mm. In some embodiments, especially where the panel is used as cladding on a building, the thickness of the panel is preferably from 4 to 12 mm, more preferably from 5 to 10 mm and most preferably from 6 to 8 mm. In alternative embodiments, especially where the panel is used as an insulation panel for a wall of a ceiling, the thickness of the panel is preferably from 12 to 25 mm, more preferably from 15 to 23 mm and most preferably from 18 to 21 mm.

The precise quantity of mineral fibres used in the method of the invention is chosen so as to maintain appropriate fire resistance properties and appropriate thermal and/or acoustic insulation value and limiting cost, whilst maintaining an appropriate level of cohesion, depending on the appropriate application. A high quantity of fibres increases the fire resistance of the element, increases its acoustic and thermal insulation properties and limits cost, but decreases the cohesion in the element. This means that the lower limit of 70 wt % results in an element having excellent cohesion and strength. If insulation properties and fire resistance are particularly important the amount of fibres can be increased to the upper limit of less than 90 wt %, but this will result in cohesion properties that are less than those achieved at the lower limit. For a majority of applications a suitable composition will include a fibre amount of from 70 to 89 wt % or 80 to 89 wt % or from 83 to 89 wt %. Most usually, a suitable quantity of fibres will be from 85 to 88 wt %.

The amount of binder is also chosen on the basis of desired cohesion, strength and cost, plus properties such as reaction to fire and thermal insulation value. It has been found that a level of binder of greater than 10% leads to improved "machinability" as described above. The low limit of greater than 10 wt % results in a composite with a lower strength and cohesion, but which is adequate for many applications and is still adequately "machinable" as discussed above. It also has the benefit of relatively low cost and potential for good thermal and acoustic insulation properties. In applications where a higher mechanical strength is needed, a higher amount of binder should be used, such as up to the upper limit of 30 wt %. This will increase the cost of the resulting product and the reaction to fire will often be less favourable, depending on the choice of binder. For a majority of applications, a suitable composition will include a binder amount at least 10.1 wt %, and preferably the level is at least 10.6 wt %, in particular from 11 to 30 wt % or from 11 to 20 wt % or from 11 to 17 wt %. Most usually, a suitable quantity of binder will be from 12 to 15 wt %.

The mineral fibres (also known as man-made vitreous fibres or MMVF) used according to the present invention could be any mineral fibres, including glass fibres, ceramic fibres or stone fibres, but preferably stone fibres are used. Stone wool fibres generally have a content of iron oxide at least 3% and alkaline earth metals (calcium oxide and magnesium oxide) from 10 to 40%, along with the other usual oxide constituents of mineral wool. These are silica; alumina; alkali metals (sodium oxide and potassium oxide) which are usually present in low amounts; and can also include titania and other minor oxides. Fibre diameter is often in the range 3 to 20 microns, in particular 5 to 10 microns, as conventional.

Preferably, the mineral fibres and binder together form at least 96%, more preferably at least 98% and most preferably substantially all of the total weight of starting materials.

The presence of organic fibres in a mineral fibre-containing element would reduce the resistance of the element to fire and reduce the insulation properties of the element. Therefore, preferably, the starting materials comprise less than 5% organic fibres. More preferably, the starting materials comprise substantially no organic fibres.

As used herein, the term "collected web" is intended to include any mineral fibres that have been collected together on a surface, i.e. they are no longer entrained in air, e.g. granulate, tufts or recycled web waste.

The collected web could be a primary web that has been formed by collection of fibres on a conveyor belt and provided as a starting material without having been cross-lapped or otherwise consolidated. Alternatively, the collected web could be a secondary web that has been formed by cross-lapping or otherwise consolidating a primary web. Preferably, the collected web is a primary web.

In one embodiment, the disentanglement process comprises feeding the web of mineral fibres from a duct with a lower relative air flow to a duct with a higher relative air flow. In this embodiment, the disentanglement is believed to occur, because the fibres that enter the duct with the higher relative air flow first are dragged away from the subsequent fibres in the web. This type of disentanglement is particularly effective for producing open tufts of fibres, rather than the compacted lumps that can result in an uneven distribution of materials in the product.

Preferably, the speed of the higher relative air flow is from 20 m/s to 150 m/s or from 30 m/s to 120 m/s. More preferably it is from 40 m/s to 80 m/s and most preferably from 50 m/s to 70 m/s. The higher relative air flow can be separate from the primary air flow, but more usually, it will feed into the primary air-flow.

Preferably, the difference in speed between the lower relative air flow and the higher relative air flow is at least 20 m/s, more preferably at least 40 m/s and most preferably at least 50 m/s.

As used herein, the term "air flow" should be understood broadly so as to include not only a flow of air comprising gases in the proportions present in the atmosphere of Earth, but also a flow of any suitable gas or gases in any suitable proportions.

According to a particularly preferred embodiment, the disentanglement process comprises feeding the collected web to at least one roller which rotates about its longitudinal axis and has spikes protruding from its circumferential surface. In this embodiment, the rotating roller will usually also contribute at least in part to the higher relative air flow. Often, rotation of the roller is the sole source of the higher relative air flow.

In some embodiments there are at least two rollers. These rollers may operate in tandem or sequentially.

The roller may be of any suitable size, but in a preferred embodiment, the roller has a diameter based on the outermost points of the spikes of from 20 cm to 80 cm or more preferably from 30 cm to 70 cm. Even more preferably the diameter is from 40 cm to 60 cm and most preferably from 45 cm to 55 cm.

The roller may rotate at any suitable speed. For most embodiments a suitable rate of rotation for the roller is from 500 rpm to 5000 rpm, preferably from 1000 rpm to 4000 rpm, more preferably from 1500 rpm to 3500 rpm, most preferably from 2000 rpm to 3000 rpm.

The dimensions and rate of rotation of the roller can be selected to provide a given speed at the circumference of the roller. In general, a high speed will result in a more effective disentanglement process, although this will depend on the type of web of mineral fibres used and the exact form of the roller. In most embodiments it will be suitable for the outermost points of the spikes of the roller to move at a speed of from 20 m/s to 150 m/s, preferably from 30 m/s to 120 m/s, more preferably from 40 m/s to 80 m/s and most preferably from 50 m/s to 70 m/s.

The roller is preferably positioned within a substantially cylindrical chamber. The chamber will have an inlet through which the mineral fibres and optionally the binder are fed to the roller. The chamber will also have an outlet through which the disentangled mineral fibres and optionally the binder are expelled. Preferably, they are expelled in the primary air flow through the outlet.

In preferred embodiments, the mineral fibres and optionally the binder are fed to the roller from above. It is also preferred for the disentangled mineral fibres and optionally the binder to be thrown away from the roller laterally from the lower part of its circumference. In the most preferred embodiment, the mineral fibres are carried approximately 180 degrees by the roller before being thrown off.

The roller preferably occupies the majority of the chamber. Preferably the tips of the spikes are less than 10 cm, more preferably less than 7 cm, and most preferably less than 4 cm from the curved wall of the substantially cylindrical chamber. This results in the air flow created by the roller being greater and a more thorough disentanglement of the fibres by the air flow and by the spikes themselves.

Preferably, the mineral fibres are fed to the roller from above.

The disentangled fibres are generally thrown off the roller in the primary air flow. In some embodiments, the roller will contribute to the primary air flow. In other embodiments, the roller will be the sole source of the primary air flow.

According to the invention, the fibres are suspended in a primary air flow. An advantage of suspending in an air flow is that unwanted particles or agglomerations can be sifted out. Such particles are e.g. pearls of the fibres and agglomerations such as inter alia heavy chunks of wool, which have not been properly opened up to fibres, such as so-called chewing gum.

The primary air flow is generally not free from turbulence. In preferred embodiments, there is significant turbulence within the primary air flow as this promotes opening of the tufts of fibres and can improve sifting of unwanted particles and agglomerates. According to the present invention, the speed of the primary air flow at its source is preferably from 20 m/s to 150 m/s, more preferably from 30 m/s to 120 m/s, even more preferably from 40 m/s to 80 m/s and most preferably from 50 m/s to 70 m/s.

The primary air flow preferably enters a sifting chamber. In the sifting chamber, turbulence within the primary air flow allows denser particles to be sifted to the bottom of the chamber and promotes opening of the tufts of fibres.

In order to effect a thorough sifting of the fibres, it is preferred to configure the apparatus such that the average dwell time of the fibres within the sifting chamber is at least 0.5 s, more preferably at least 2 s, or even at least 3 s.

However, it is usually not necessary for the average dwell time of the fibres within the sifting chamber to be greater than 10 s. More usually, the average dwell time is less than 7 s and most usually the average dwell time is less than 5 s.

The ambient temperature within the sifting chamber, when used, is usually from 20° C. to 100° C., more usually from 30° C. to 70° C. The temperature could be dependent on outside air temperature, i.e. cold in winter and hot in summer. Elevated temperatures of up to 100° C. could be used for providing a pre-curing of the binder in the sifting chamber.

In specific embodiments, the binder is a material that, under certain conditions, dries, hardens or becomes cured. For convenience, these and similar such processes are referred to herein as "curing". Preferably, these "curing" processes are irreversible and result in a cohesive composite material.

Inorganic as well as organic binders can be employed. Organic binders are preferred. Further, dry binders as well as wet binders can be used. Specific examples of binder materials include but are not limited to phenol formaldehyde binder, urea formaldehyde binder, phenol urea formaldehyde binder, melamine formaldehyde binder, condensation resins, acrylates and other latex compositions, epoxy polymers, sodium silicate, hotmelts of polyurethane, polyethylene, polypropylene and polytetrafluoroethylene polymers etc.

In an embodiment a dry binder is used. Any suitable dry binder could be used, but it is preferred to use a phenol formaldehyde binder, as this type of binder is easily available and has proved efficient. It may be an advantage to use a dry binder as in some events mixing may be easy, and further the need for maintenance of the equipment is low. Further the binder is relatively stable and storable.

According to an alternative embodiment a wet binder is used. Wet binders have the advantage of low cost compared to dry binders, and it is often possible to reduce the amount of binder using wet binder compared to dry binders. A reduction in the amount of binder further results in a better reaction of the composite to fire. Any suitable wet binder could be used, but it is preferred to use a phenol formaldehyde binder, as this type of binder is easily available and has proved efficient.

The binder may be mixed with the mineral fibres before, during or after the disentanglement process. In some embodiments, especially where the binder is wet, it is preferred to mix the binder with the fibres prior to the disentanglement process. In particular, the fibres can be in the form of an uncured collected web containing wet binder.

When dry binder is used, this could, for example, be premixed with a collected web of mineral fibres before the disentanglement process. Further mixing could occur during and after the disentanglement process. Alternatively it could be supplied to the primary air flow separately and mixed in the primary air flow.

The mineral fibres and binder, when suspended in the primary air flow, are, in some embodiments, subjected to a further air flow in a different direction to the primary air flow. This helps to generate further turbulence in the primary air flow, which assists mixing, sifting and opening of the tufts of fibres. Usually the primary air flow is generally lateral and the further air flow is generally upwards. In some embodiments, a plurality of further air flows is provided.

Preferably the further air flow has a speed of 0.1 to 20 m/s, more preferably from 0.1 to 10 m/s, still more preferably from 0.2 to 7 m/s, most preferably from 1 to 3 m/s.

The mixture of mineral fibres and binder is collected from the primary air flow by any suitable means. In one embodiment, the primary air flow is directed into the top of a cyclone chamber, which is open at its lower end and the mixture is collected from the lower end of the cyclone chamber.

In an alternative embodiment, the primary air flow is directed through a foraminous surface, which catches the mixture as the air flow passes through.

Preferably, the mixture of mineral fibres and binder is subjected to a further fibre disentanglement process after the mixture has been suspended in the primary air flow, but before the mixture is pressed and cured.

The further disentanglement process may have any of the preferred features of the disentanglement process described previously.

In a particularly preferred method, the mixture of mineral fibres and binder is removed from the primary air flow, preferably in a cyclone chamber, and fed to a rotating roller having spikes protruding from its circumferential surface. The roller of the further disentanglement means may have any of the features described above in relation to the roller to which the collected web can be fed initially.

The mixture of mineral fibres and binder is preferably thrown from the further disentanglement process into a forming chamber.

Having undergone the further disentanglement process, the mixture of mineral fibres and binder is collected, pressed and cured. Preferably, the mixture is collected on a foraminous conveyor belt having suction means positioned below it.

In a preferred method according to the invention, the mixture of binder and mineral fibres, having been collected, is scalped before being cured and pressed.

The method may be performed as a batch process, however according to an embodiment the method is performed at a mineral wool production line feeding a primary or secondary mineral wool web into the fibre separating process, which provides a particularly cost efficient and versatile method to provide composites having favourable mechanical properties and thermal insulation properties in a wide range of densities.

According to a special embodiment the method is performed as an on-line process in a mineral wool production line.

Once the mixture of mineral fibres and binder has been collected, it is pressed and cured to produce an element of the desired density.

Pressure, temperature and holding time for the curing and pressing are dependent inter alia on the type of binder used.

An aspect of the invention relates to a mineral fibre-containing element obtainable by the method of the invention.

The element is preferably substantially homogeneous.

By the wording "substantially homogeneous" it should be understood that the composite is homogeneous at a millimeter scale, i.e. in a microscope an area of e.g. 1 mm$^2$ is (substantially) identical to other samples of the mixture.

An apparatus suitable for carrying out the method of the invention comprises:
a mineral fibre-forming apparatus for producing a supply of fibres entrained in air,
binder supply apparatus for supplying binder to the fibres,
a first collector arranged to receive the fibres from the fibre-forming apparatus,
suction apparatus for applying suction through the collector and thereby collecting the fibres on the collector as a web,
a disentanglement apparatus for disentangling the web to provide disentangled fibres,
web supply apparatus for supplying the web to the disentanglement apparatus,
air supply apparatus for supplying a primary air flow in which to suspend disentangled mineral fibres,
a second collector for collecting the disentangled mineral fibres and binder, and a press for pressing the collected disentangled mineral fibres and binder.

The mineral fibre-forming apparatus can be any apparatus suitable for that purpose, for example, a cascade spinner or a spinning cup. In preferred embodiments of the apparatus, the mineral fibre-forming apparatus is a cascade spinner. In each case, a mineral melt is supplied and fibres are produced by the effect of centrifugal action of the apparatus.

The binder supply means supplies binder to the mineral fibres. It can be positioned at any point before the second collector, but is preferably positioned between the fibre-forming apparatus and the first collector. In another embodiment, the binder supply means is positioned between the first collector and the second collector. In another preferred embodiment, the binder supply means is positioned between the first collector and the disentanglement means.

The binder supply means could be adapted to supply wet binder or to supply dry binder.

The first collector is preferably in the form of a continuously operated first conveyor belt. The belt is pervious to air. The fibres form a primary web on the belt. Suction means are positioned behind the first collector to allow an air flow through the collector.

The apparatus may optionally comprise means for treating the primary web in any manner known to the person skilled in the art. For example, the apparatus can comprise a pendulum belt for cross-lapping the primary web onto a further continuously operated conveyor belt, to form a secondary mineral fibre web.

It is preferred that the first collector is in the form of a conveyor belt leading to an inlet duct. The inlet duct may have conveying rollers at its upper edge to assist with the movement of the mineral fibres through the inlet duct.

Between the first collector and the disentanglement apparatus, there can be a substantially vertical duct. Often the substantially vertical duct will be narrower at its lower end than at its upper end.

The apparatus comprises disentanglement means for disentangling the primary or secondary web to form disentangled fibres. The disentanglement apparatus can have a first duct for carrying the primary or secondary web and a second duct adjoined to the first duct. In this case, the disentanglement apparatus comprises means for supplying an air flow in the second duct with a higher speed than is present in the first duct.

In particular, the disentanglement means can be in the form of a roller as described in relation to the method of the invention.

Furthermore, the apparatus can comprise a cylindrical chamber that houses the roller as described in relation to the method of the invention.

The apparatus also requires air supply means for supplying the primary air flow. This air supply means can be formed as part of the disentanglement apparatus. For example, the means for supplying an air flow in the second duct with a higher speed than is present in the first duct could also be the supply of the primary air flow.

It is also possible for the roller to act as the means for generating the primary air flow itself as it creates a flow of disentangled mineral fibres suspended in an air flow.

In the apparatus, a further air flow supply means may be present for supplying a further air flow to the primary air flow.

The apparatus can comprise a sifting chamber as described in relation to the method of the invention. The further air flow supply means, when present, are preferably positioned at the lower end of the sifting chamber and configured to supply an upwards flow of air within the sifting chamber. The primary air flow supply means is preferably positioned at the side of the sifting chamber and is configured to supply an air flow laterally across the chamber.

When present, the further air flow supply means may have a gauze disposed across its opening to prevent the entry of solid materials.

At the lower end of the sifting chamber, there is preferably a discharge opening into which heavy pellets or compacted fibres fall.

It is preferred that the mineral fibres and binder enter the sifting chamber together at one side suspended in the primary air flow. The mixture is then blown upwards and further mixed by a further air supply means positioned at the lower end of the chamber. The mixture then leaves the sifting chamber via a removal duct at the upper end of the sifting chamber.

The removal duct leads eventually to a second collector. The collector may be in the form of a foraminous belt, behind which suction means are positioned.

Alternatively, the collection means could comprise a cyclone chamber capable of separating the mixture of mineral fibres and from the primary air flow. In this embodiment, the cyclone chamber has an opening at its lower end, through which the mixture is ejected, whilst the air flow is removed through a duct at the upper end. The cyclone chamber has a greater diameter at its upper end than at its lower end.

In one embodiment the mixture is ejected from the cyclone chamber onto a conveyor belt.

There is preferably a further disentanglement apparatus positioned to receive the mixture of mineral fibres and binder. The further disentanglement apparatus may have any of the preferred features described in relation to the disentanglement apparatus for disentangling the collected web of mineral fibres.

Preferably, the further disentanglement apparatus is positioned to receive the mixture of mineral fibres and binder from the opening at the lower end of the cyclone chamber.

Preferably, there is a forming chamber positioned to receive fibres and binder from the further disentanglement apparatus. Preferably, the forming chamber comprises a foraminous conveyor belt for collecting the mixture of mineral fibres and binder.

It is preferred to provide scalping means prior to the press. The apparatus can be configured to recycle the scalped material.

The apparatus suitable for carrying out the method of the invention comprises a press for pressing and curing the collected mixture of mineral fibres and binder. The press is suitable for pressing the element to a density of from 120 $kg/m^3$ to 1000 $kg/m^3$, such as 170 $kg/m^3$ to 1000 $kg/m^3$. Generally, the press is adapted to heat the element in order to cure the binder.

BRIEF DESCRIPTION OF THE DRAWINGS

The invention will be described in the following by way of example and with reference to the drawings in which.

DETAILED DESCRIPTION OF THE INVENTION

Figure 1:
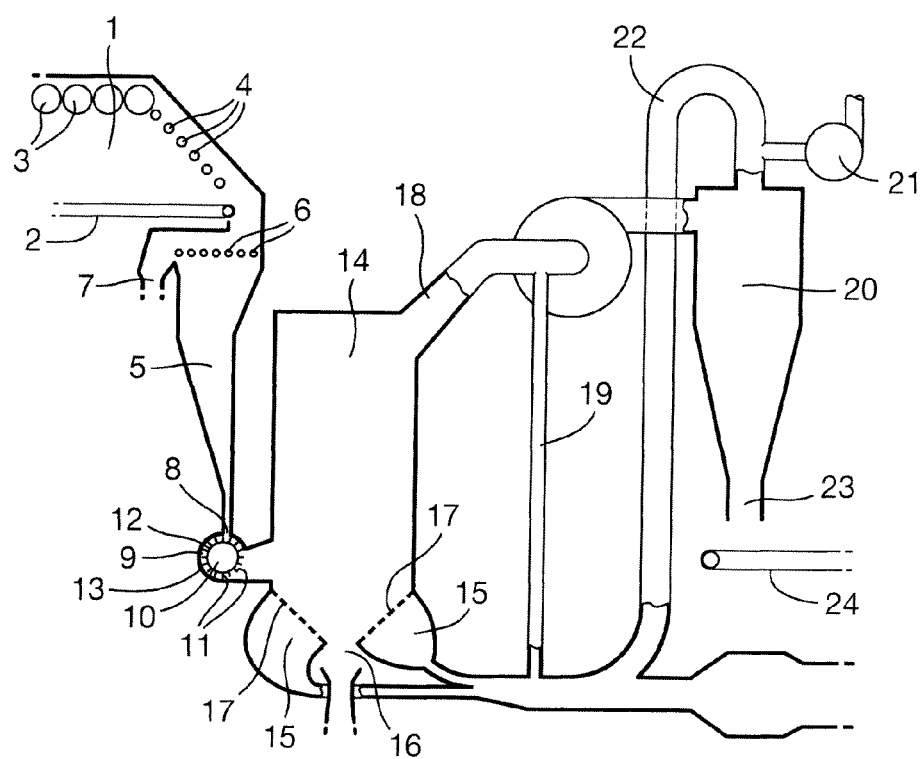
FIG. 1 is a schematic drawing of an apparatus for fibre separating and mixing raw materials.

Apparatus suitable for use in the method of the present invention can be seen in FIG. 1, where a fibre-forming apparatus and collector are configured to carry a mineral fibre web to the inlet duct 1, a binder supply means is positioned to supply binder to the mineral fibres to the inlet duct.

The apparatus comprises an inlet duct 1 for starting materials, e.g. binder and mineral fibres and for specific raw materials the apparatus may comprise a shredder (not shown) at the inlet duct 1 to at least partly cut up bulky material. At the lower edge of the inlet duct, there is a conveyor 2 that carries the starting materials through the inlet duct 1. At the upper edge of the inlet duct, conveying rollers 3 assist with feeding the starting materials through the inlet duct 1. At the end of the inlet duct 1, a first set of mutually spaced elongate elements 4 extend across the end of the inlet duct 1. These serve to break up larger pieces of the starting materials, for example the mineral fibre web. In some embodiments, the elongate elements 4 are in the form of rotating brushes that draw the starting materials between them as they rotate.

The starting materials that pass through the end of the inlet duct then fall downwards into a substantially vertical duct 5. In the embodiment shown, a second set of mutually spaced elongate elements 6 extend across the upper end of the duct. The second set of elongate elements is usually more closely spaced than the first. In the embodiment shown, the second set of elongate elements rotate so as to allow sufficiently small pieces of the mineral fibre web to pass through, but carry larger pieces away via a starting material recycling duct 7.

The vertical duct 5 generally becomes narrower at its lower end. In the embodiment shown, the lower end of the vertical duct forms the inlet 8 to the substantially cylindrical chamber 9. As shown, the inlet 8 is at an upper part of the substantially cylindrical chamber 9. In use, starting materials pass through the vertical duct 5 and through the inlet 8 into the cylindrical chamber 9.

In an alternative embodiment the vertical duct 5 is omitted. Instead a feeding mechanism is provided for feeding in a web of fibres directly to the cylindrical chamber 9. The feeding mechanism may for example comprise a conveyor belt and optionally one or more feed rollers arranged for controlled advancing and guiding of the web into the cylindrical chamber 9.

The cylindrical chamber 9 houses a roller 10 having spikes 11 protruding from its circumferential surface 12. The roller 10 shown in FIG. 1 rotates anticlockwise as shown in the drawing, so that starting materials are carried from the inlet 8 around the left side of the roller 10 as shown and thrown out laterally in a primary air flow into a sifting chamber 14. The cylindrical chamber 9 and the roller 10 together form the disentanglement means.

The spikes may be permanently fixed to the roller for optimum resistance to wear and tear. For example the spikes may be fixed by gluing or welding the spikes in blind holes arranged in the roller outer periphery. Alternatively the spikes may be replaceable. This can for example be accomplished by the roller being a hollow cylinder with through holes in the cylindrical wall. The spikes can then for example have a head and be inserted through the holes from inside through the holes. Hereby spikes can be replaced if they are broken or worn. Further by having replaceable spikes it is possible to change the pattern of the spikes. Hereby it is possible to optimize the pattern for different types of material to be disentangled, e.g. loose mineral wool fibres, or a collected web of mineral wool fibres impregnated with a liquid binder.

In the embodiment shown, the primary air flow is created by the rotation of the roller 10 within the cylindrical chamber 9, and in particular by the movement of the spikes 11 and starting material through the space between the circumferential surface of the roller and the curved wall 13 of the cylindrical chamber 9.

The sifting chamber 14 shown in FIG. 1 comprises a discharge opening 16 and further air flow supply means 15. The further air flow supply means 15 comprise openings through which the further air flow is supplied. Gauzes 17 are disposed across the openings of the further air flow supply means 15. These gauzes allow the further air flow to pass through into the sifting chamber 14, but are intended to prevent the entry of materials into the supply means. The further air flow supply means 15 shown direct the further air flow upwards into the sifting chamber 14.

The further air flow meets the primary air flow containing the disentangled fibres in the sifting chamber. The further air flow has the effect of carrying the mixture of disentangled fibres and binder upwards within the sifting chamber 14. Some more compacted fibres and pearls of mineral material will not be carried upwards in the sifting chamber, but fall to the lower end and through the discharge opening 16.

The desired mixture of disentangled fibres and binder is carried to the upper part of the sifting chamber 14 where a removal duct 18 is positioned to carry the mixture from the sifting chamber 14. A first air recycling duct 19 is adjoined to the removal duct 18 and recycles some of the air from the removal duct 18 back to the further air supply means 15.

The removal duct leads to a cyclone chamber 20. The cyclone chamber 20 has a second air recycling duct 22 leading from its upper end to the further air supply means 15. A filter 21 is adjoined to the second air recycling duct. In use, the filter 21 removes any stray mineral fibres and binder from the second air recycling duct 22. As air is removed from the upper end of the cyclone chamber 20, the mixture of disentangled fibres and binder falls through a cyclone chamber outlet 23 at the lower end of the cyclone chamber 20.

A collector 24 is positioned below the cyclone chamber outlet 23. In the embodiment shown, the collector 24 is in the form of a conveyor, which carries the collected fibres and binder to a pressing and curing apparatus (not shown).

Figure 2:
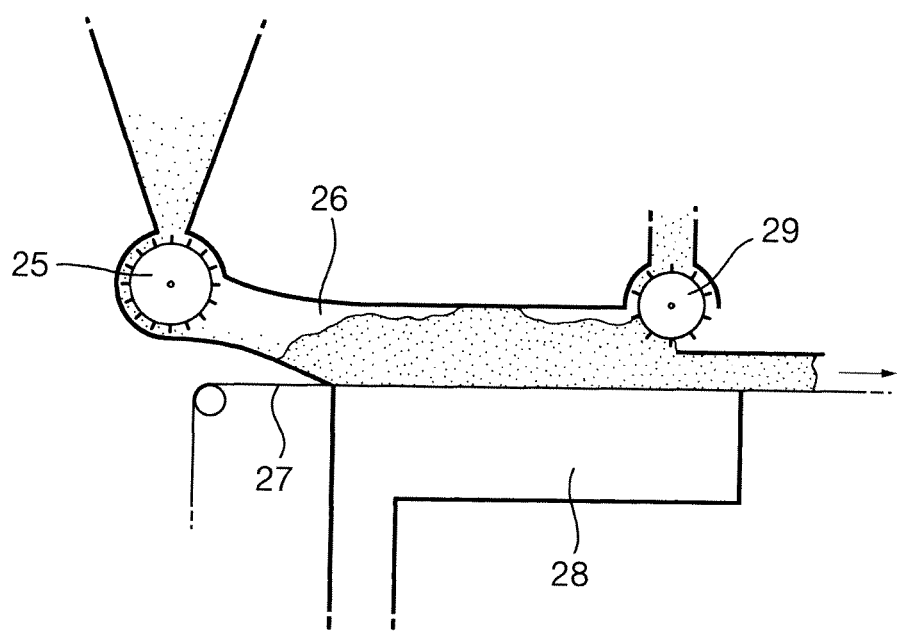
FIG. 2 is a schematic drawing of a further disentanglement apparatus as described above.

FIG. 2 shows an embodiment of the further disentanglement apparatus, which may optionally be used in the method. The further disentanglement apparatus can be positioned in place of collector 24 as shown in FIG. 1. The further disentanglement apparatus shown comprises roller 25, which is the same as roller 10 in structure. The mixture of components is fed to roller 25 from above and thrown out into forming chamber 26. At its lower end, the forming chamber 26 comprises a foraminous conveyor belt 27, below which suction means 28 are positioned. Scalper 29 is positioned to scalp the top of the mixture to provide an even surface. The scalped material can then be recycled.

Foraminous conveyor belt 27 carries the mixture to a press (not shown).

The invention claimed is:

1. A method for manufacturing a mineral fibre-containing element, said method comprising the steps of:
   providing mineral fibres in an amount of from 70 to less than 89 wt % of the total weight of starting materials in the form of a collected web,
   providing a thermally curable binder in an amount of greater than 11 up to 30 wt % of the total weight of starting materials,
   subjecting the collected web of fibres to a disentanglement process, suspending the fibres in a primary air flow,
   mixing the thermally curable binder with the mineral fibres before, during or after the disentanglement process to form a mixture of mineral fibres and thermally curable binder,
   collecting the mixture of mineral fibres and thermally curable binder and pressing and curing the mixture to provide a consolidated composite with a density of from 120 kg/m$^3$ to 1000 kg/m$^3$,
   wherein the mineral fibres and thermally curable binder, when suspended in the primary air flow, are subjected to a further air flow in a different direction to the primary air flow, and
   wherein the primary air flow is generally lateral and the further air flow is generally upwards, and
   wherein the mineral fibres and thermally curable binder together make up at least 96% of the total weight of starting materials.

2. A method according to claim 1, wherein the binder is selected from the group consisting of phenol formaldehyde binder, urea formaldehyde binder, phenol urea formaldehyde binder, melamine formaldehyde binder, condensation resins, acrylates and epoxy polymers.

3. A method according to claim 1, wherein the disentanglement process comprises feeding the web from a duct with a lower relative air flow to a duct with a higher relative air flow.

4. A method according to claim 3, wherein the speed of the higher relative air flow is from 20 m/s to 150 m/s, preferably from 30 m/s to 120 m/s, more preferably from 40 m/s to 80 m/s, most preferably from 50 m/s to 70 m/s.

5. A method according to claim 1, wherein the disentanglement process comprises feeding the collected web to at least one roller which rotates about its longitudinal axis and has spikes protruding from its circumferential surface.

6. A method according to claim 5, wherein the roller has a diameter based on the outermost points of the spikes of from 20 cm to 80 cm, preferably from 30 cm to 70 cm, more preferably from 40 cm to 60 cm and most preferably from 45 cm to 55 cm.

7. A method according to claim 5, wherein the roller rotates at least a rate of from 500 rpm to 5000 rpm, preferably from 1 000 rpm to 4000 rpm, more preferably from 1500 rpm to 3500 rpm, most preferably from 2000 rpm to 3000 rpm.

8. A method according to claim 5, wherein the outermost points of the spikes of the roller move at a speed of from 20 m/s to 150 m/s, preferably from 30 m/s to 120 m/s, more preferably from 40 m/s to 80 m/s, most preferably from 50 m/s to 70 m/s.

9. A method according to claim 1, wherein the mineral fibres are provided in the form on an uncured web containing wet binder.

10. A method according to claim 1, wherein the method is performed at a mineral wool production line, which feeds a primary or secondary mineral wool web into the fibre disentanglement process.

11. A method according to claim 1, wherein the primary air flow has an initial speed of from 20 m/s to 150 m/s, preferably from 30 m/s to 120 m/s, more preferably from 40 m/s to 80 m/s, most preferably from 50 m/s to 70 m/s.

12. A method according to claim 1 wherein the further air flow has a speed of from 0.1 to 20 m/s, preferably from 0.1 to 10 m/s, more preferably from 0.2 to 7 m/s, most preferably from 1 to 3 m/s.

13. A method according to claim 1, wherein the binder is provided in dry form.

14. A method according to claim 1, wherein the binder is provided in wet form.

15. A method according to claim 1, wherein no organic fibres are mixed with the mineral fibres and binder.

16. A method according to claim 15, wherein the mineral fibres and binder together make up at least 98% and more preferably substantially all of the total weight of starting materials.

17. A method according to claim 1, wherein the consolidated composite has a density of from 170 kg/m$^3$ to 1000 kg/m$^3$.

* * * * *